US012430090B2

(12) United States Patent
Agrawal et al.

(10) Patent No.: US 12,430,090 B2
(45) Date of Patent: Sep. 30, 2025

(54) VIRTUAL VIEW OF A DEVICE BASED ON DEVICE CONTEXTUAL STATE

(71) Applicant: Motorola Mobility LLC, Chicago, IL (US)

(72) Inventors: Amit Kumar Agrawal, Bangalore (IN); Olivier D Meirhaeghe, Lincolnshire, IL (US); Jeffrey T Snow, Barrington, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/394,529

(22) Filed: Dec. 22, 2023

(65) Prior Publication Data

US 2025/0208813 A1 Jun. 26, 2025

(51) Int. Cl.
*G06F 3/14* (2006.01)
(52) U.S. Cl.
CPC .................. *G06F 3/1423* (2013.01)
(58) Field of Classification Search
CPC .................................................. G06F 3/1423
See application file for complete search history.

(56) References Cited

U.S. PATENT DOCUMENTS

| 10,386,890 | B2 * | 8/2019 | Myung | G06F 1/1649 |
| 11,409,370 | B1 * | 8/2022 | Pavlou | H04M 3/567 |
| 2009/0099812 | A1 * | 4/2009 | Kahn | H04M 1/72403 |
| | | | | 702/152 |
| 2013/0080964 | A1 * | 3/2013 | Shigeta | H04M 1/72466 |
| | | | | 715/773 |
| 2013/0111370 | A1 | 5/2013 | Pasquero et al. | |
| 2013/0214996 | A1 * | 8/2013 | Reeves | H04N 21/4438 |
| | | | | 345/1.3 |
| 2014/0194066 | A1 | 7/2014 | Li | |
| 2014/0317530 | A1 | 10/2014 | Chang et al. | |
| 2015/0194135 | A1 * | 7/2015 | Higashi | G09G 5/006 |
| | | | | 345/2.2 |
| 2016/0239250 | A1 * | 8/2016 | Kim | G06F 3/1454 |
| 2017/0075640 | A1 | 3/2017 | Chun et al. | |

(Continued)

OTHER PUBLICATIONS

Apple , "Universal Control: use a single keyboard and mouse between your Mac and iPad", Apple Support [retrieved Dec. 14, 2023]. Retrieved from the Internet <https://support.apple.com/en-in/HT212757>, Nov. 3, 2023, 5 pages.

(Continued)

*Primary Examiner* — Antonio Xavier
(74) *Attorney, Agent, or Firm* — FIG. 1 Patents

(57) ABSTRACT

When the two electronic devices are connected (e.g., wired or wireless connection), a determination is made as to whether a contextual state of at least one of the electronic devices (e.g., a smartphone or tablet) indicates that a virtual view of the electronic device is to be displayed by the other electronic device. The contextual state may include, for example, whether the displays of the two electronic devices are spatially aligned, whether the one electronic device is upside down, whether a display of the one electronic device is turned off, and so forth. The virtual view of the electronic device is a display of the user interface of the electronic device, allowing a user to interact with the electronic device via the virtual view of the electronic device.

20 Claims, 9 Drawing Sheets

(56) References Cited

U.S. PATENT DOCUMENTS

| | | | |
|---|---|---|---|
| 2017/0139661 A1* | 5/2017 | Veeramani | G06F 3/03543 |
| 2017/0285788 A1* | 10/2017 | Park | H04W 4/80 |
| 2019/0302972 A1* | 10/2019 | Kline | G06F 3/017 |
| 2020/0042268 A1* | 2/2020 | Kim | G06F 3/04886 |
| 2020/0042274 A1* | 2/2020 | Park | G06F 3/1431 |
| 2020/0053253 A1* | 2/2020 | Kavallierou | H04N 21/4622 |
| 2021/0191579 A1* | 6/2021 | Li | G06F 9/451 |
| 2022/0391158 A1* | 12/2022 | Lemmens | G06F 3/1438 |
| 2023/0051203 A1 | 2/2023 | Wang et al. | |
| 2023/0146677 A1* | 5/2023 | Woo | G06Q 50/10 |
| | | | 345/156 |
| 2023/0273812 A1 | 8/2023 | Bian et al. | |
| 2024/0220095 A1* | 7/2024 | Ye | G06F 1/1698 |
| 2025/0110680 A1 | 4/2025 | Agrawal et al. | |

OTHER PUBLICATIONS

"Universal Control: Use a single keyboard and mouse between Mac and iPad", Apple Inc. [retrieved Jul. 19, 2023]. Retrieved from the Internet <https://support.apple.com/en-in/HT212757>., 5 Pages.

"Non-Final Office Action", U.S. Appl. No. 18/374,344, filed Jan. 29, 2025, 22 pages.

"Final Office Action", U.S. Appl. No. 18/374,344, filed May 14, 2025, 25 pages.

\* cited by examiner

VIRTUAL VIEW OF A DEVICE BASED ON DEVICE CONTEXTUAL STATE

BACKGROUND

As technology has advanced, our uses for electronic devices have expanded. One such use is small mobile devices, such as smartphones, which have become increasingly powerful despite their small size. These mobile devices provide a great deal of portable processing power but are not without their problems. One such problem is that situations arise in which users desire to use their mobile devices alongside other electronic devices, such as a laptop computer. This can result in the user having to interact with the two devices separately, which can be frustrating for users and lead to user frustration with their devices.

BRIEF DESCRIPTION OF THE DRAWINGS

Embodiments of virtual view of a device based on device contextual state are described with reference to the following drawings. The same numbers are used throughout the drawings to reference like features and components.

DETAILED DESCRIPTION

Displaying a virtual view for a device based on a contextual state of the device is discussed herein. Generally, an electronic device (e.g., a smartphone or tablet) can be connected to another electronic device that is typically a computing device (e.g., a mobile device such as a laptop or a non-mobile device such as a desktop computer or workstation), allowing the electronic devices to be used together. This connection can be a wired connection or a wireless connection. When the electronic device and the computing device are connected, a single input control device (e.g., a trackpad on a laptop or a mouse) can be used to control user input for both devices.

When the two electronic devices are connected, a determination is made as to whether a contextual state of at least one of the electronic devices (e.g., a smartphone or tablet) indicates that a virtual view of the electronic device is to be displayed by the other electronic device. The contextual state may include, for example, whether the displays of the two electronic devices are spatially aligned (e.g., positioned at approximately the same angle relative to a surface (e.g., the horizon) and are facing approximately the same direction), whether the one electronic device is upside down, whether a display of the one electronic device is turned off, and so forth. The virtual view of the electronic device is a display of the user interface of the electronic device, allowing a user to interact with the electronic device via the virtual view of the electronic device. If the virtual view of the electronic device is to be displayed by the other electronic device, the virtual view of the electronic device is displayed by the other electronic device until one or more criteria are satisfied, such as the contextual state of at least one of the electronic devices indicates that the virtual view of the electronic device is no longer to be displayed by the other electronic device.

The techniques discussed herein improve the operation of an electronic device by automatically displaying a virtual view of one electronic device on the display of another electronic device when it is deemed appropriate. For example, if a user places his phone on the desktop face down next to his laptop computer, using the techniques discussed herein a virtual view of the phone is automatically displayed on the laptop computer, allowing the user to interact with the phone via user input to the laptop computer.

Figure 1:
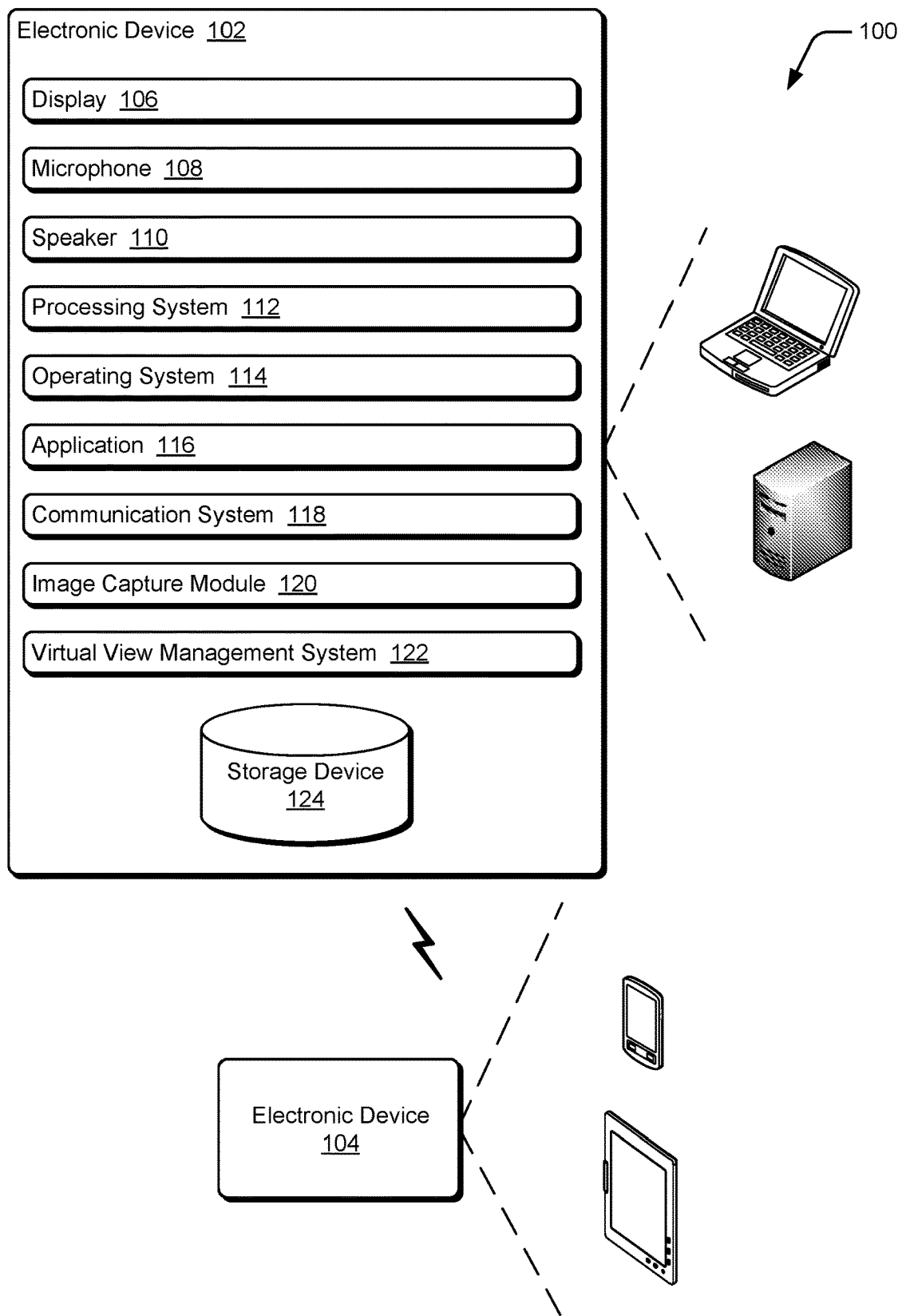
FIG. 1 illustrates an example system implementing the techniques discussed herein.

FIG. 1 illustrates an example system 100 implementing the techniques discussed herein. The system 100 includes an electronic device 102 that can be, or include, many different types of computing or electronic devices. For example, the electronic device 102 can be a laptop computer, a desktop computer, an automotive computer, a tablet, and so forth. The system 100 also includes an electronic device 104, which can also be many different types of computing or electronic devices but is typically (although need not be) a different type of electronic device than the electronic device 102. For example, the electronic device 104 can be a computing device, such as a smartphone or other wireless phone, a tablet, and so forth.

In one or more implementations, the electronic device 104 is a touch-enabled device. A touch-enabled device refers to a device that receives touch inputs via the display (e.g., a touchscreen). A touch-enabled device may also receive inputs via other input mechanisms, such as trackpad, mouse, physical keyboard, and so forth. In other implementations, the electronic device 104 is a non-touch-enabled device. A non-touch-enabled device refers to a device that does not receive touch inputs via the display (e.g., a touchscreen). Accordingly, a non-touch-enabled device receives inputs via other input mechanisms, such as trackpad, mouse, physical keyboard, and so forth.

The electronic device 102 can be a touch-enabled device or a non-touch-enabled device.

The electronic device 102 includes a display 106. The display 106 can be configured as any suitable type of display, such as an organic light-emitting diode (OLED) display, active matrix OLED display, liquid crystal display (LCD), in-plane shifting LCD, projector, and so forth. The display 106 can also optionally operate as an input device (e.g., the display 106 can be a touchscreen display).

The electronic device 102 also includes a microphone 108 and a speaker 110. The microphone 108 can be configured as any suitable type of microphone incorporating a transducer that converts sound into an electrical signal, such as a dynamic microphone, a condenser microphone, a piezoelectric microphone, and so forth. The speaker 110 can be configured as any suitable type of speaker incorporating a transducer that converts an electrical signal into sound, such as a dynamic loudspeaker using a diaphragm, a piezoelectric speaker, non-diaphragm based speakers, and so forth.

Although illustrated as part of the electronic device 102, it should be noted that one or more of the display 106, the microphone 108 and the speaker 110 can be implemented separately from the electronic device 102. In such situations, the electronic device 102 can communicate with the microphone 108 or the speaker 110 via any of a variety of wired (e.g., Universal Serial Bus (USB), USB-C, IEEE 1394, High-Definition Multimedia Interface (HDMI)) or wireless (e.g., Wi-Fi, Bluetooth, infrared (IR)) connections. For example, the microphone 108 may be separate from the electronic device 102 and voice inputs received by the microphone 108 are communicated to the electronic device 102 via an IR or radio frequency wireless connection.

The electronic device 102 also includes a processing system 112 that includes one or more processors, each of which can include one or more cores. The processing system 112 is coupled with, and may implement functionalities of, any other components or modules of the electronic device 102 that are described herein. In one or more embodiments, the processing system 112 includes a single processor having a single core. Alternatively, the processing system 112 includes a single processor having multiple cores or multiple processors (each having one or more cores).

The electronic device 102 also includes an operating system 114. The operating system 114 manages hardware, software, and firmware resources in the electronic device 102. The operating system 114 manages one or more applications 116 running on the electronic device 102 and operates as an interface between applications 116 and hardware components of the electronic device 102.

The electronic device 102 also includes a communication system 118. The communication system 118 manages communication with electronic device 104 and optionally various other devices. The electronic device 102 can be coupled to or connected to the electronic device 104 and communicate with the electronic device 104 using any of a variety of wired or wireless connections, such as USB, USB-C, WiFi™, WiFi™ IP (Internet Protocol), USB IP, Bluetooth™, DisplayPort, High-Definition Multimedia Interface (HDMI), and so forth. Typically, the electronic device 102 is removably connected to the electronic device 104, allowing the electronic device 104 to be connected to the electronic device 104 and subsequently disconnected from the electronic device 104.

The electronic device 102 also includes an image capture module 120. The image capture module 120 captures images digitally using any of a variety of different technologies, such as a charge-coupled device (CCD) sensor, a complementary metal-oxide-semiconductor (CMOS) sensor, combinations thereof, and so forth. The image capture module 120 can include a single sensor and lens, or alternatively multiple sensors or multiple lenses. For example, the image capture module 120 may have at least one lens and sensor positioned to capture images from the front of the electronic device 102 (e.g., the same surface as the display is positioned on), and at least one additional lens and sensor positioned to capture images from the back of the electronic device 102. The image capture module 120 can capture still images as well as video.

The electronic device 102 also includes a virtual view management system 122. The virtual view management system 122 determines when to display a virtual view of the electronic device 104 on the display 106 (e.g., when to activate display of the virtual view of the electronic device 104 on the display 106), and when to cease displaying the virtual view of the electronic device 104 (e.g., a user interface (UI) of the electronic device 104) on the display 106 (e.g., when to deactivate display of the virtual view of the electronic device 104 on the display 106). Whether to display the virtual view of the electronic device 104 on the display 106 is determined based on a contextual state of at least one of the electronic device 102 and the electronic device 104, as discussed in more detail below.

The virtual view management system 122 can be implemented in a variety of different manners. For example, the virtual view management system 122 can be implemented as multiple instructions stored on computer-readable storage media and that can be executed by the processing system 112. Additionally or alternatively, the virtual view management system 122 can be implemented at least in part in hardware (e.g., as an application-specific integrated circuit (ASIC), a field-programmable gate array (FPGA), an application-specific standard product (ASSP), a system-on-a-chip (SoC), a complex programmable logic device (CPLD), and so forth).

The electronic device 102 also includes a storage device 124. The storage device 124 can be implemented using any of a variety of storage technologies, such as magnetic disk, optical disc, Flash, or other solid state memory, and so forth. The storage device 124 can store various program instructions and data for any one or more of the operating system 114, application 116, and the virtual view management system 122.

In one or more implementations, the electronic device 104 includes components analogous to those discussed above with reference to the electronic device 102, such as a display, a microphone, a speaker, a processing system, an operating system, an application, a communication system, an image capture module, and a storage device. The electronic device 104 may or may not include a virtual view management system.

Figure 2:
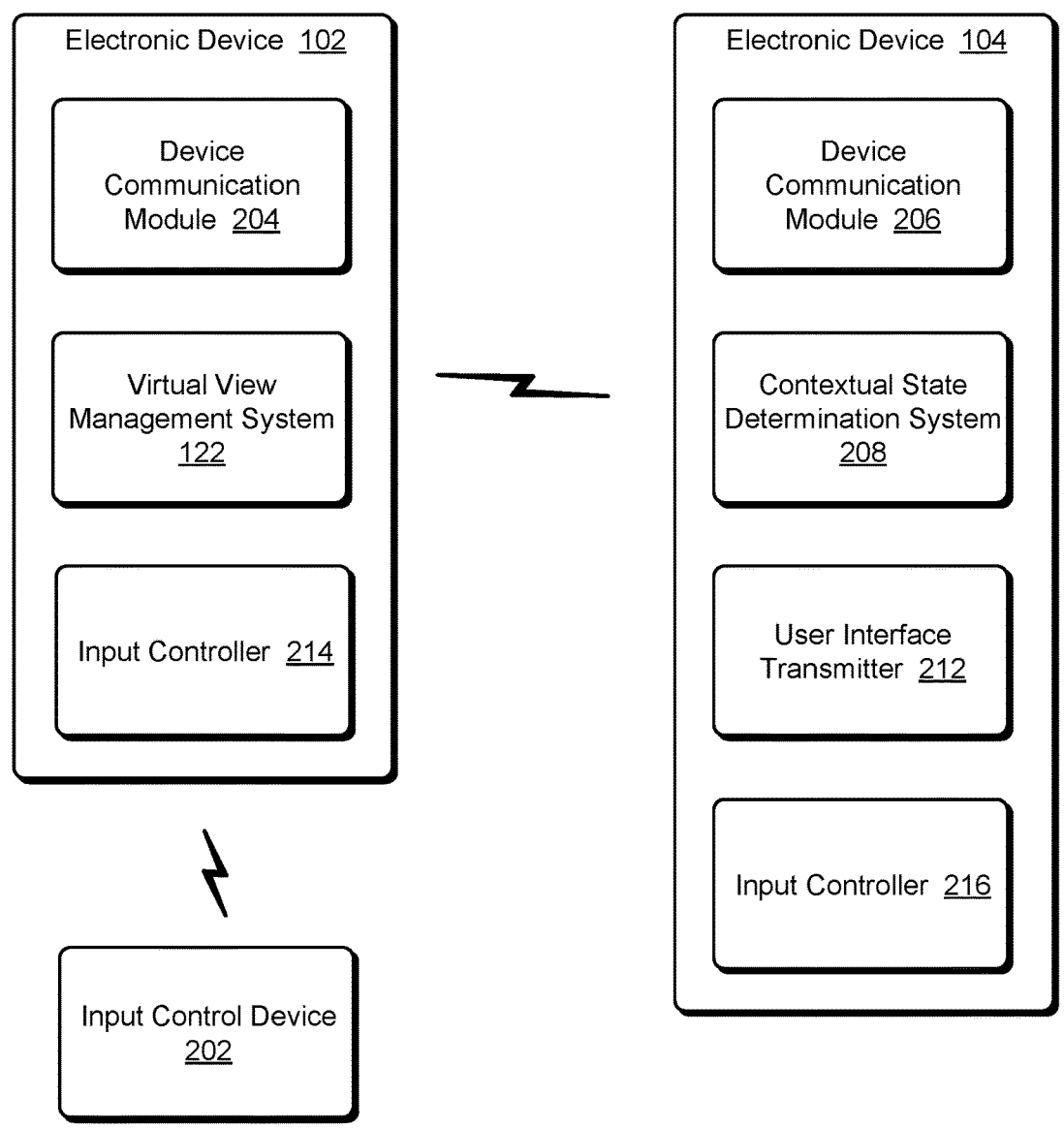
FIG. 2 illustrates an example architecture implementing the techniques discussed herein.

FIG. 2 illustrates an example architecture 200 implementing the techniques discussed herein. The architecture 200 includes the electronic device 102, the electronic device 104, and an input control device 202. The input control device 202, which may also be referred to as a cursor control device or a pointer control device, can be implemented in any of a variety of manners. For example, the input control device 202 may be a mouse, trackpad, keyboard, and so forth. Although illustrated as separate from the electronic device 104, in one or more implementations the input control device 202 is part of the electronic device 104 (e.g., a trackpad of a laptop device).

The electronic device 102 includes a device communication module 204 that implements functionality to detect when the electronic device 102 is connected to the electronic device 104 and to communicate with the electronic device 104 (e.g., send and receive various signals, data, and so forth). Similarly, the electronic device 104 includes a device communication module 206 that implements functionality to detect when the electronic device 104 is connected to the electronic device 102 and to communicate with the electronic device 102 (e.g., send and receive various signals, data, and so forth). The electronic devices 102 and 104 can be connected to one another using one or more of a wired or wireless connection. The electronic devices 102 and 104 can be directly connected to one another (e.g., with no intermediary device or system) or indirectly connected to one another (e.g., via one or more other devices or systems such as a router, switch, hub, wireless access point, and so forth).

The device communication module 204 can detect that the electronic device 102 is connected to the electronic device 104 (and similarly the device communication module 206 can detect that the electronic device 104 is connected to the electronic device 102) using any of a variety of public or proprietary techniques. For example, the device communication module 206 can transmit a signal that is received by the device communication module 204 indicating that the electronic device 104 is connected to the electronic device 102.

The electronic device 104 includes a contextual state determination system 208 that identifies a contextual state of the electronic device 104. The contextual state of the electronic device 104 refers to a physical location or orientation of the electronic device 104 or a configuration of the electronic device 104. The contextual state of the electronic device 104 may or may not be relative to the electronic device 102. For example, the contextual state of the electronic device 104 may be whether the electronic device 104 is lying face down (e.g., on a surface such as a desk or table), whether a display of the electronic device 104 is turned off, whether a display of the electronic device 104 is spatially aligned with a display of the electronic device 102, a size of the display of the electronic device 104 (e.g., relative to a size of the display of the electronic device 102), and so forth.

The contextual state determination system 208 can be implemented in any of a variety of different manners. For example, the contextual state determination system 208 can be implemented as multiple instructions stored on computer-readable storage media and that can be executed by a processing system (e.g., analogous to the processing system 112 of FIG. 1). Additionally or alternatively, the contextual state determination system 208 can be implemented at least in part in hardware (e.g., as an ASIC, an FPGA, an ASSP, an SoC, a CPLD, and so forth).

In one or more implementations, the contextual state determination system 208 determines whether a display of the electronic device 104 and a display of the electronic device 102 are spatially aligned. The contextual state determination system 208 makes this determination in any of various manners. In one or more implementations, the two displays are spatially aligned (also referred to as the electronic devices 102 and 104 being spatially aligned) when the two displays are positioned at approximately the same angle (e.g., relative to a surface, such as the horizon) and are facing approximately the same direction. For example, the contextual state determination system 208 determines that the two displays are spatially aligned if the two displays are positioned at approximately the same angle relative to a surface (e.g., the horizon) and are facing approximately the same direction.

The contextual state determination system 208 determines whether the two displays are positioned at approximately the same angle relative to a surface in any of a variety of different manners. In one or more implementations, the display of the electronic device 102 includes one or more sensors that determine an angle of the display of the electronic device 102 relative to a surface (e.g., relative to the horizon), such as one or more of a gyroscope, an accelerometer, or a magnetometer (e.g., all of which may be included in an inertial measurement unit (IMU)), and so forth. Additionally or alternatively, the electronic device 102 includes one or more sensors that determine an angle of the display of the electronic device 102 relative to another portion of the electronic device and uses that angle as the angle of the display of the electronic device 102 relative to a surface. For example, if the electronic device 102 is a laptop computer, sensors in the electronic device 102 determine the angle of the display relative to the housing or keyboard of the laptop, and that angle is used as the angle of the display of the electronic device 102 relative to a surface. The electronic device 102 transmits an indication of the angle of the display of the electronic device 102 to the electronic device 104.

In one or more implementations, the electronic device 104 also determines an angle of the display of the electronic device 104 relative to the surface (e.g., a same surface as used in determining the angle of the display of the electronic device 102). The electronic device 104 determines the angle of the display of the electronic device 104 relative to the surface in any of a variety of different manners, e.g., analogous to any of the manners in which the angle of the display of the electronic device 102 is determined as discussed above. The electronic device 104 may determine the angle of the display of the electronic device 104 relative to the surface in the same manner as the electronic device 102 determines the angle of the display of the electronic device 102 relative to the surface, or in a different manner.

The contextual state determination system 208 determines whether the two displays are positioned at approximately the same angle relative to a surface based on the angle of the display of the electronic device 102 and the angle of the display of the electronic device 104. In one or more implementations, if the angles of the displays of the electronic devices 102 and 104 are approximately the same (e.g., within a threshold number of degrees such as 5 or 10 degrees) then the contextual state determination system 208 determines that the two displays are positioned at approximately the same angle relative to a surface. For example, if the display of the electronic device 102 and the display of the electronic device 104 are both approximately vertical (e.g., within a threshold number of degrees of vertical, such as 5 or 10 degrees) or are both approximately horizontal (e.g., within a threshold number of degrees of horizontal, such as 5 or 10 degrees) then the contextual state determination system 208 determines that the two displays are positioned at approximately the same angle relative to a surface. The surface used to determine horizontal or vertical can be, for example, the Earth or the horizon.

Figure 3:
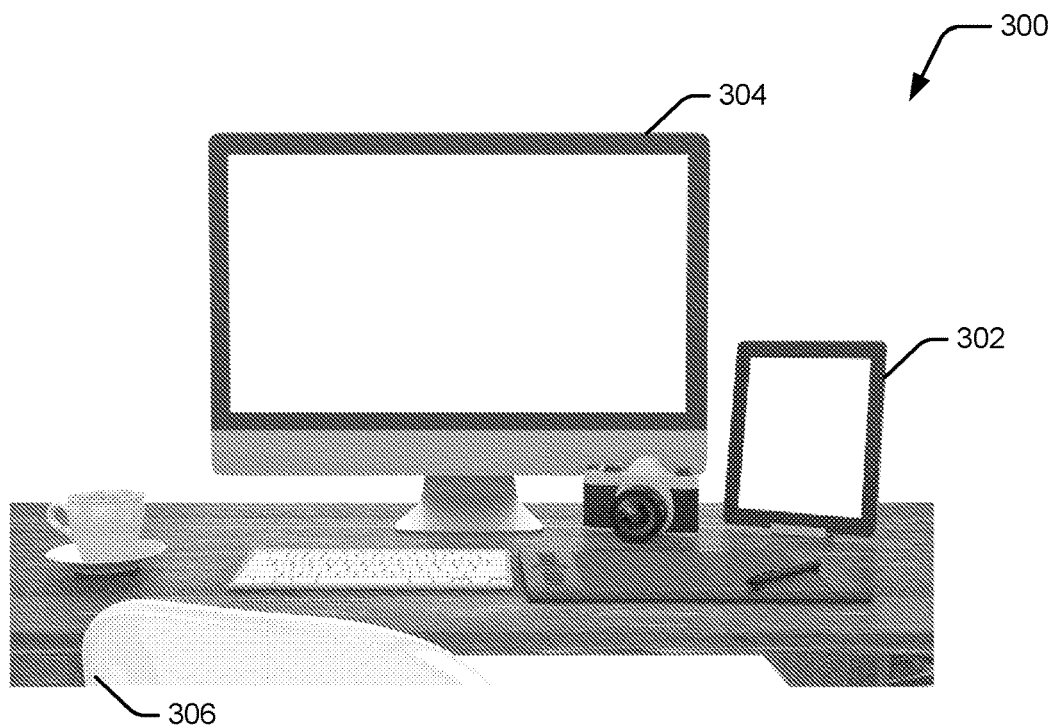
FIG. 3 illustrates an example of displays that are spatially aligned.

FIG. 3 illustrates an example 300 of displays that are spatially aligned. In the example 300, displays of two electronic devices are illustrated as display 302 (e.g., of a tablet) and display 304 (e.g., of a desktop computer). As illustrated the displays 302 and 304 are both approximately vertical and thus are spatially aligned.

Figure 4:
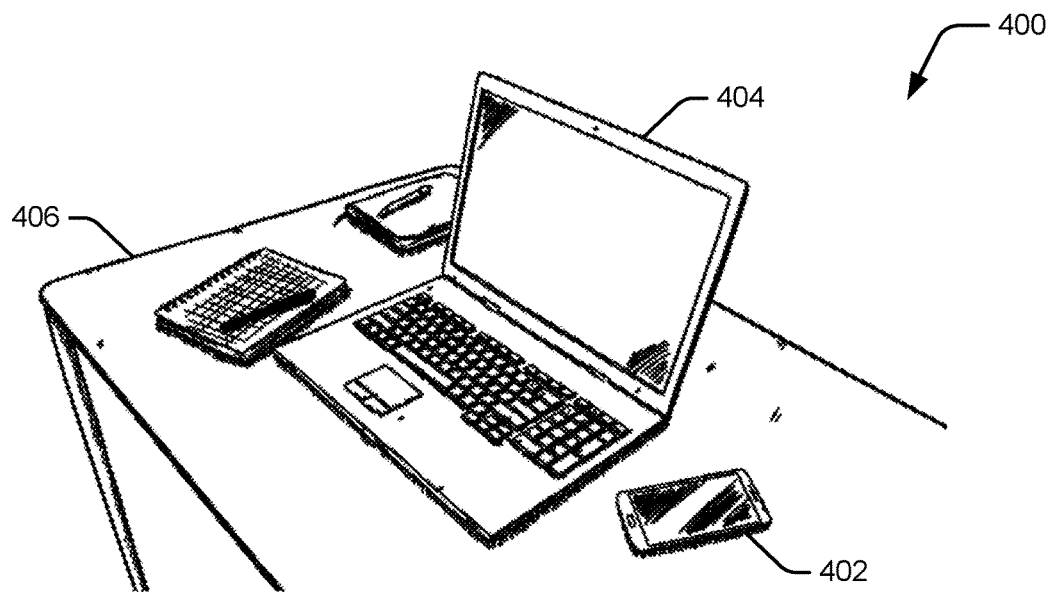
FIG. 4 illustrates an example of displays that are not spatially aligned.

FIG. 4 illustrates an example 400 of displays that are not spatially aligned. In the example 400, displays of two electronic devices are illustrated as display 402 (e.g., of a smartphone) and display 404 (e.g., of a laptop computer). As illustrated, the display 404 is approximately vertical whereas the display 402 is approximately horizontal. Accordingly, the displays 402 and 404 are not spatially aligned.

Returning to FIG. 2, in one or more implementations the contextual state determination system 208 determines whether the two displays are positioned at approximately the same angle relative to a surface using other techniques. For example, the contextual state determination system 208 determines whether the two displays are positioned at approximately the same angle relative to a surface based on a position of the head of the user (e.g., an angle of the user's head relative to a surface). For example, the contextual state determination system 208 determines a position of the head of the user of the electronic device 104 (e.g., an angle of the user's face relative to the display of the electronic device 104 as indicated by images captured by an image capture module of the electronic device 104) and also receives an indication from the electronic device 102 of a position of the head of the user of the electronic device 102 (e.g., an angle of the user's face relative to the display of the electronic device 102 as indicated by images captured by the image capture module 120). If the position of the head of the user as determined by the contextual state determination system 208 is approximately the same (e.g., within 5 or 10 degrees) as the position of the head indicated in the indication received from the electronic device 102, then the contextual state determination system 208 determines that the two displays are positioned at approximately the same angle relative to a surface.

The contextual state determination system 208 determines whether two displays are facing approximately the same direction in any of a variety of different manners. In one or more implementations, the contextual state determination system 208 analyzes the gaze of a user of the electronic device 104 and determines, based on the gaze, whether the user is looking at the display of the electronic device 102. The gaze of the user refers to where the user is looking, such as direction his or her pupils are facing. The gaze of the user is captured by an image capture module of the electronic device 104. Any of a variety of public or proprietary techniques can be used to analyze the user's pupils to determine an angle, relative to the image capture module, at which the pupils are positioned and thus whether the user is looking at the display of the electronic device 104.

Similarly, the electronic device 102 analyzes the gaze of a user of the electronic device 102 (e.g., using a system analogous to the contextual state determination system 208) and determines, based on the gaze, whether the user is looking at the display of the electronic device 102. The electronic device 102 transmits to the electronic device 104 (e.g., to the contextual state determination system 208) an indication of whether the user is looking at the display of the electronic device 102 analogous to the discussion above regarding contextual state determination system 208.

The contextual state determination system 208 determines whether the displays of the electronic devices 102 and 104 are facing approximately the same direction based on the determination of whether the user is looking at the display of the electronic device 104 and the indication received from the electronic device 102 of whether the user is looking at the display of the electronic device 102. For example, if the user is looking at the display of the electronic device 104 and the indication received from the electronic device 102 indicates the user is looking at the display of the electronic device 102, then the contextual state determination system 208 determines that the displays of the electronic devices 102 and 104 are facing approximately the same direction. However, if the user is not looking at the display of the electronic device 104 or the indication received from the electronic device 102 indicates the user is not looking at the display of the electronic device 102, then the contextual state determination system 208 determines that the displays of the electronic devices 102 and 104 are not facing approximately the same direction.

Figure 5:
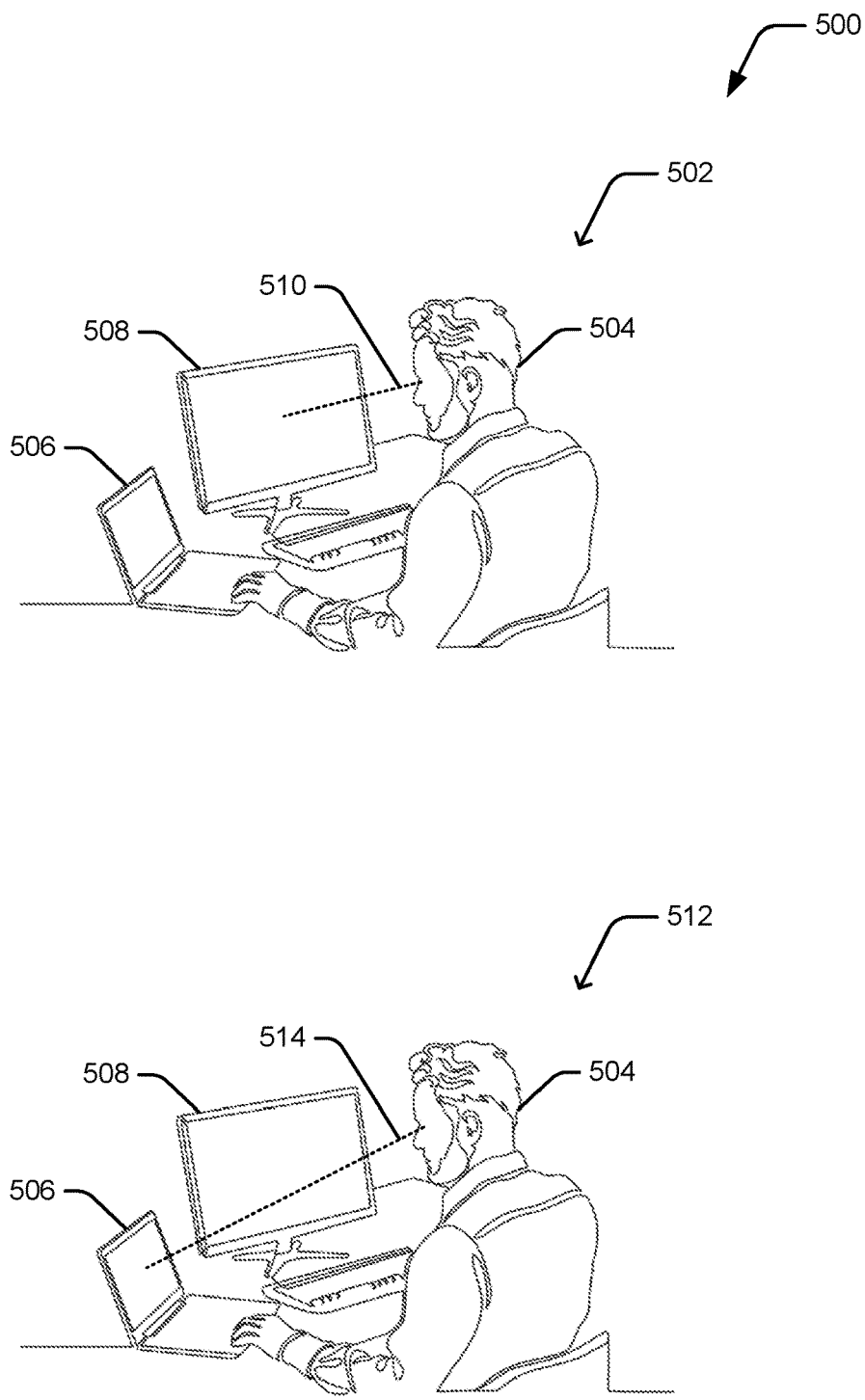
FIG. 5 illustrates an example of the gaze of a user.

FIG. 5 illustrates an example 500 of the gaze of a user. At 502, a user 504 having two electronic devices 506 and 508 is illustrated. A dashed line 510 illustrates the gaze of the user 504 at 502, with the user looking at (gazing at) the electronic device 508.

At 512, the user 504 having the two electronic devices 506 and 508 is illustrated. A dashed line 514 illustrates the gaze of the user 504 at 512, with the user looking at (gazing at) the electronic device 506.

Returning to FIG. 2, additionally or alternatively, an image capture module of the electronic device 102 captures images of the user and transmits those images to the contextual state determination system 208. The contextual state determination system 208 uses the images received from the electronic device 102 to determine whether the user is looking at the display of the electronic device 102. Accordingly, the electronic device 102 need not include a system capable of determining whether the user is looking at the display of the electronic device 104.

Additionally or alternatively, the contextual state determination system 208 uses different techniques (e.g., other than using the gaze of a user) to determine whether two displays are facing approximately the same direction. For example, the contextual state determination system 208 can analyze images captured by the image capture module of the electronic device 104 as well as images received from the electronic device 102 (e.g., captured by an image capture module 120) to determine whether the scenes in the images are approximately the same. If the scene in one or more images captured by image capture module of the electronic device 102 and the scene in one or more images captured by the image capture module of the electronic device 104 are approximately the same, then the contextual state determination system 208 determines that the two displays are facing approximately the same direction. However, if the scene in one or more images captured by the image capture module of the electronic device 102 and the scene in one or more images captured by the image capture module of the electronic device 104 are not approximately the same then the contextual state determination system 208 determines that the two displays are facing approximately the same direction. Any of a variety of techniques can be used to determine whether two scenes are approximately the same, such as identification of common objects or persons in the scenes, light levels in the scenes, motion in the scenes, and so forth.

By way of example, images captured by an image capture module in the display 304 of FIG. 3 will capture scenes approximately similar to the scenes in images captured by an image capture module of the display 302, such as scenes including the chair 306, a wall or other objects (not shown) behind the chair 306, and so forth. By way of another example, images captured by an image capture module in the display 404 of FIG. 4 will capture scenes that are not approximately similar to the scenes in images captured by an image capture module of the display 402. E.g., scenes captured by an image capture module in the display 404 will include objects such as a chair, wall, or people (not shown) behind the desk 406, whereas scenes captured by an image capture module in the display 402 will include objects such as a ceiling, a light fixture or ceiling fan (not shown), and so forth above the desk 406.

Returning to FIG. 2, in one or more implementations, the contextual state determination system 208 determines whether the displays of the electronic devices 102 and 104 are spatially aligned and provides an indication of whether the displays of the electronic devices 102 and 104 are spatially aligned to the electronic device 102. This allows the virtual view management system 122 of the electronic device 102 to, for example, activate a virtual view display that displays a virtual view of the electronic device 104 (e.g., a UI of the electronic device 104) on a display of the electronic device 102 as discussed in more detail below.

It should be noted that the displays of two electronic devices can be spatially aligned even if other portions of the electronic devices are not spatially aligned. For example, an electronic device may be laying down or placed vertically (e.g., a desktop computer, the housing or keyboard of a laptop computer) while the display of the electronic device is positioned at a different angle. E.g., in the example 300 of FIG. 3, a desktop computer (not shown) may be providing content for display on the display 304. The display 302 is spatially aligned with the display 304 even if the display 302 is not spatially aligned with other portions or surfaces of the desktop computer providing content for display on the display 304.

Additionally or alternatively, the contextual state determination system 208 determines whether the electronic device 104 is kept upside down, such as lying face down on a surface (e.g., on a desk or table). The contextual state determination system 208 determines whether the electronic device 104 is kept upside down in any of a variety of different manners. In one or more implementations, the electronic device 104 includes one or more sensors that determine an angle of the display of the electronic device 104 relative to a surface (e.g., relative to the horizon), such as one or more of a gyroscope, an accelerometer, or a magnetometer (e.g., all of which may be included in an IMU), and so forth.

Additionally or alternatively, the electronic device 104 includes an ambient light sensor that detects an amount of light at the front surface of the electronic device 104 (the same surface as includes the display of the electronic device 104).

Additionally or alternatively, the contextual state determination system 208 analyzes images captured by an image capture module of the electronic device 104 to determine what, if any, objects are included in the scenes in the captured images.

The contextual state determination system 208 determines whether the electronic device 104 is lying face down based at least in part on the contextual state of the electronic device 104. In one or more implementations, the contextual state determination system 208 determines that the electronic device 104 is lying face down if the light sensor indicates low light (e.g., light level of less than a threshold amount, such as less than 3-5 lux). Additionally or alternatively, the contextual state determination system 208 determines that the electronic device 104 is lying face down if the light sensor indicates low light (e.g., light level of less than a threshold amount, such as less than 3-5 lux) or no objects are detected in the scenes in the captured images. Additionally or alternatively, the contextual state determination system 208 determines that the electronic device 104 is lying face down if the electronic device 104 is approximately horizontal (e.g., within 5 or 10 degrees of horizontal) and one or both of the light sensor indicates low light (e.g., light level of less than a threshold amount, such as less than 3-5 lux) or no objects are detected in the scenes in the captured images.

Additionally or alternatively, the contextual state determination system 208 determines whether a display of the electronic device 104 is turned off. The contextual state determination system 208 determines whether the display of the electronic device 104 is turned off in any of a variety of different manners. In one or more implementations, the contextual state determination system 208 receives an indication from an operating system of the electronic device 104 or a display controller of the electronic device 104 indicating whether the display of the electronic device 104 is turned on or turned off.

Additionally or alternatively, the contextual state determination system 208 determines a size of the display of the electronic device 104 (e.g., relative to a size of the display of the electronic device 102). The contextual state determination system 208 determines the size of the display of the electronic device 104 in any of a variety of manners, such as receiving an indication of the size from an operating system of the electronic device 104 or accessing configuration or build information of (e.g., stored on) the electronic device 104. Additionally or alternatively, the contextual state determination system 208 determines the size of the display of the electronic device 104 in any of a variety of manners, such as receiving an indication of the size from the electronic device 102 (which received an indication of the size from an operating system of the electronic device 102 or accessing configuration or build information of (e.g., stored on) the electronic device 102).

The contextual state determination system 208 transmits an indication of the contextual state of the electronic device 104 to the virtual view management system 122. Additionally or alternatively, the electronic device 104 includes a contextual state determination system, analogous to the contextual state determination system 208, that determines the contextual state of the electronic device 104 and provides to the virtual view management system 122 an indication of the contextual state of the electronic device 104. Such a contextual state determination system in the electronic device 102 determines the contextual state of the electronic device 104 based on various information received from the electronic device 104, such as images captured by an image capture module of the electronic device 104, an angle of the display of the electronic device 104 relative to a surface (e.g., relative to the horizon), an amount of light at the front face of the electronic device 104, and so forth analogous to the discussion above.

The virtual view management system 122 determines, based on the contextual state of the electronic device 104, whether to activate a virtual view of the electronic device 104 on a display device of the electronic device 102 or deactivate a virtual view of the electronic device 104 on the display device of the electronic device 102. Activating the virtual view of the electronic device 104 on the display device to the electronic device 102 can include one or more of displaying an indication (e.g., a bar) along one side of the display of the electronic device 102 (e.g., and the virtual view of the electronic device 104 is displayed on the display of the electronic device 102 in response to the user of the electronic device 102 selecting (e.g., clicking on) the indication or hovering over the indication), displaying a window on the display of the electronic device 102 that includes the virtual view of the electronic device 104, and so forth.

The virtual view management system 122 uses any of a variety of different rules or criteria to determine whether to activate or deactivate the virtual view of the electronic device 104 on the electronic device 102. In one or more implementations, the virtual view management system 122 activates the virtual view of the electronic device 104 on the electronic device 102 in response to one or more of the display of the electronic device 104 not being spatially aligned with the display of the electronic device 102, the electronic device 104 being phone being kept upside down, or the display of the electronic device 104 being turned off (regardless of whether the display of the electronic device 104 is spatially aligned with the display of the electronic device 102).

Additionally or alternatively, the virtual view management system 122 activates the virtual view of the electronic device 104 on the electronic device 102 based at least in part on a size of the display of the electronic device 102 and a size of the display of the electronic device 104. Generally, the virtual view management system 122 activates the virtual view if the size of the display of the electronic device 104 is small enough that the virtual view of the display of the electronic device 104 would not take up a significant amount of the area of the display of the electronic device 102. Various rules or criteria can be used to determine whether the virtual view of the display of the electronic device 104 would not take up a significant amount of the area of the display of the electronic device 102. For example, the view of the display of the electronic device 104 would not take up a significant amount of the area of the display of the electronic device 102 if the size of the display of the electronic device 104 is less than one-half the size of the display of the electronic device 102. The size of a display of the electronic devices 102 and 104 can be measured in different manners, such as one or more of the width of the display, the height of the display, an area of the display, and so forth.

In one or more implementations, the size of the virtual view of the electronic device 104 on the electronic device 102 is the same as the size of the display of the electronic device 102. Additionally or alternatively, the size of the virtual view of the electronic device 104 on the electronic device 102 can be increased or decreased.

In one or more implementations, the virtual view management system 122 deactivates the virtual view of the electronic device 104 on the electronic device 102 in response to one or more of the display of the electronic device 104 being spatially aligned with the display of the electronic device 102, the electronic device 104 not being kept upside down, or the display of the electronic device 104 being turned on.

Figure 6:
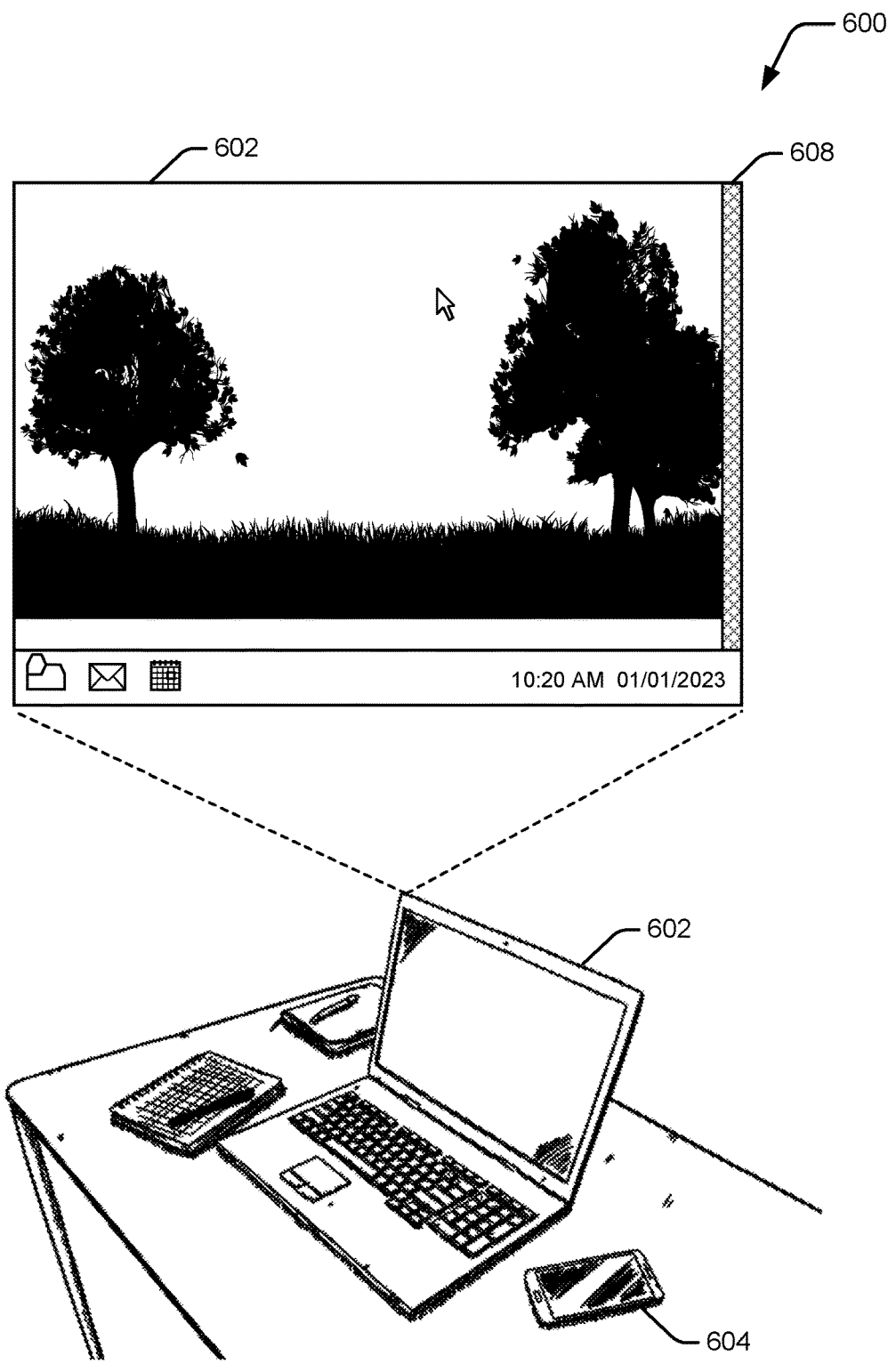
FIGS. 6, 7, and 8 illustrate examples of an activated virtual view of the display of one electronic device on the display of another.

FIG. 6 illustrates an example 600 of an activated virtual view of the display of one electronic device on the display of another. In the example 600, displays of two electronic devices (e.g., electronic devices 102 and 104 of FIG. 2) are illustrated as display 602 (e.g., of electronic device 102 illustrated as a laptop computer) and display 604 (e.g., of electronic device 104 illustrated as a smartphone). As illustrated, the display 602 is approximately vertical whereas the display 604 is approximately horizontal. Accordingly, the displays 602 and 604 are not spatially aligned and the virtual view of the display 604 is displayed on the display 602.

The virtual view of the display 604 on the display 602 is activated by displaying an indication 608 along one edge of the display of the 602. The indication 608 in the example 600 is a bar along the right edge of the display 602, illustrated with cross hatching.

The indication 608 can take various forms, such as a rectangular box along the entire edge of the display of the electronic device 102 with a particular fill or color (e.g., a green box), a rectangular box along a portion of the edge of the display of the electronic device 102 with a particular fill or color (e.g., a green box), changing the manner in which the pointer or cursor is displayed (e.g., changing the color of the pointer or cursor), and so forth.

Figure 7:
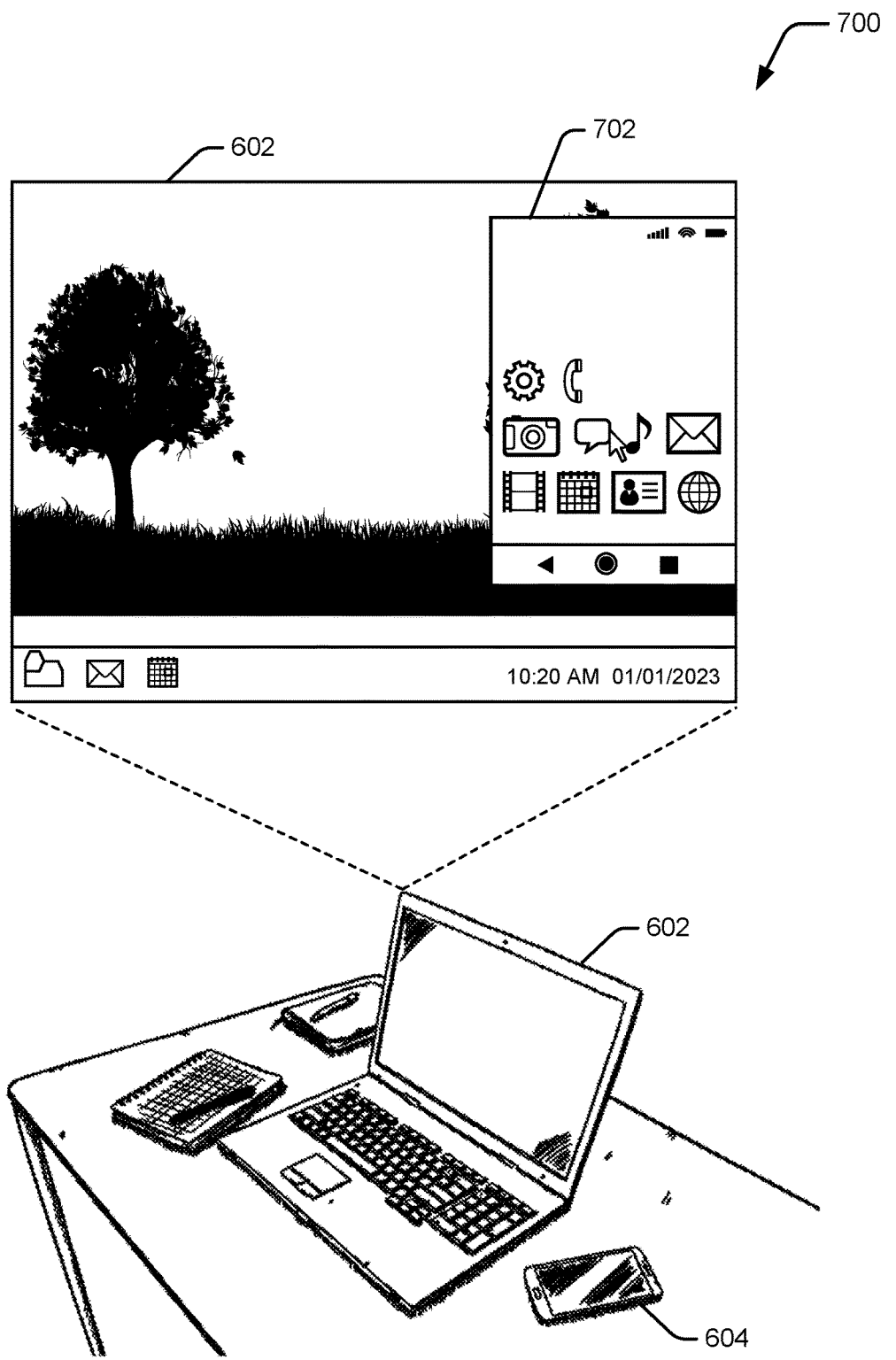

FIG. 7 illustrates an example 700 of an activated virtual view of the display of one electronic device on the display of another. The example 700 is similar to the example 600 of FIG. 6, illustrating display 602 (e.g., of electronic device 102 illustrated as a laptop computer) and display 604 (e.g., of electronic device 104 illustrated as a smartphone). As illustrated, the display 602 is approximately vertical whereas the display 604 is approximately horizontal. Accordingly, the displays 602 and 604 are not spatially aligned and the virtual view of the display 604 is displayed on the display 602.

The virtual view of the display 604 on the display 602 is activated by displaying the virtual view 702 on the display 602. The virtual view 702 is a display of the user interface of the electronic device 104 (e.g., the user interface that would typically be displayed on the display 604). In one or more implementations, the virtual view 702 is displayed on the display 602 in response to the virtual view management system determining to activate a virtual view of the electronic device 104 on the display device of the electronic device 102. Additionally or alternatively, the virtual view 702 is displayed in response to user selection (e.g., clicking on or hovering over) the indication 608 of FIG. 6.

The virtual view 702 is illustrated as pinned to the right edge of the display 602. Additionally or alternatively, the virtual view 702 is located along a different edge of the display 602.

Figure 8:
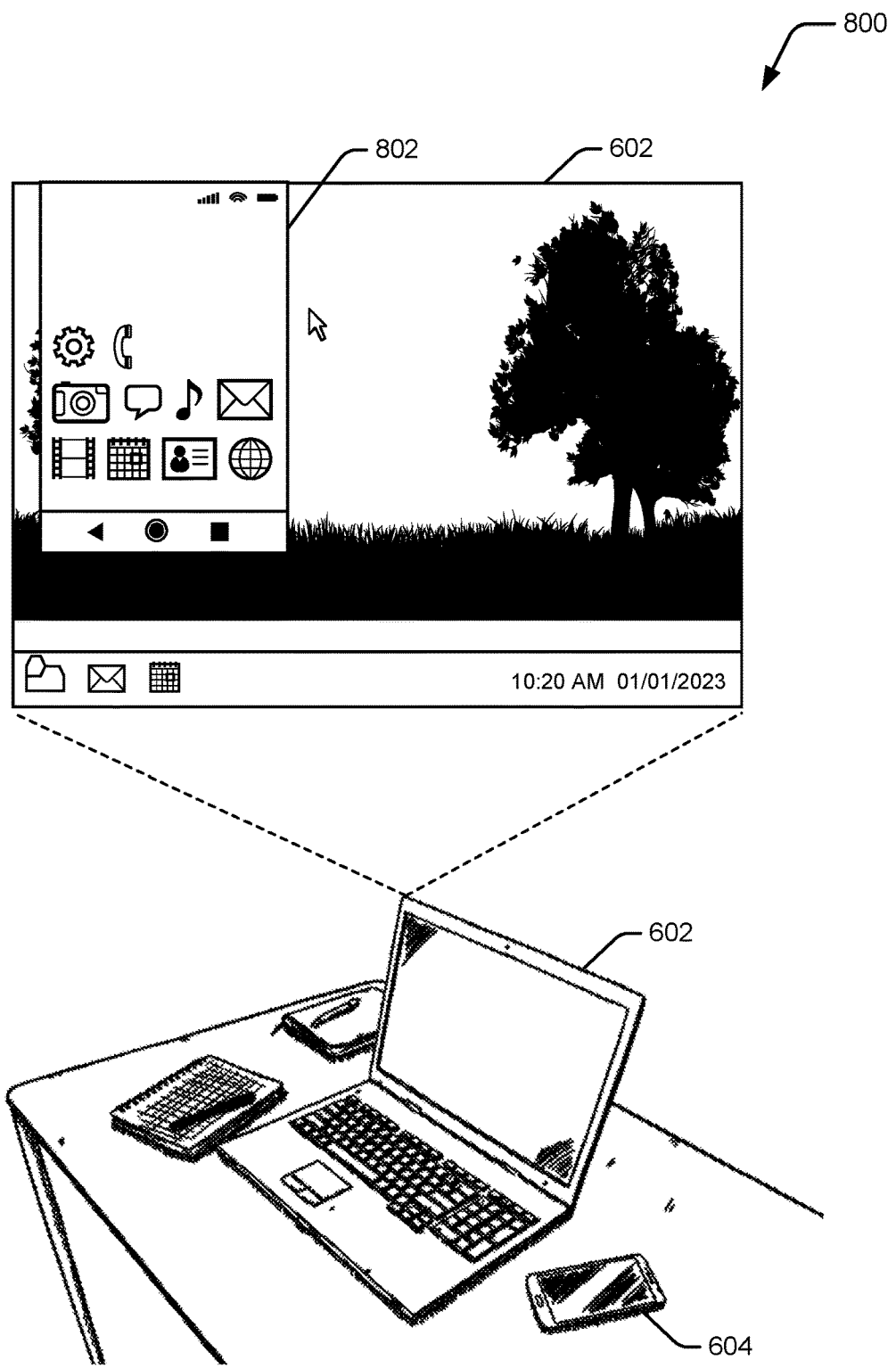

FIG. 8 illustrates an example 800 of an activated virtual view of the display of one electronic device on the display of another. The example 800 is similar to the example 700 of FIG. 7, illustrating display 602 (e.g., of electronic device 102 illustrated as a laptop computer) and display 604 (e.g., of electronic device 104 illustrated as a smartphone). As illustrated, the display 602 is approximately vertical whereas the display 604 is approximately horizontal. Accordingly, the displays 602 and 604 are not spatially aligned and the virtual view of the display 604 is displayed on the display 602.

The virtual view of the display 604 on the display 602 is activated by displaying the virtual view 802 on the display 602. The virtual view 802 is a display of the user interface of the electronic device 104 (e.g., the user interface that would typically be displayed on the display 604). The virtual view 802 is similar to the virtual view 702 of FIG. 2, but differs in the location of the virtual view 802. The virtual view 802 is displayed as a freeform window rather than pinned to a particular edge of the display 602. A freeform window refers to a user interface window that can be moved around the display 602 (e.g., dragged and dropped by the user). In one or more implementations the virtual view 802 can be resized on the display 602 (e.g., increased or decreased in size), and so forth.

In one or more implementations, the virtual view 802 is displayed on the display 602 in response to the virtual view management system determining to activate a virtual view of the electronic device 104 on the display device of the electronic device 102. Additionally or alternatively, the virtual view 802 is displayed in response to user selection (e.g., clicking on or hovering over) the indication 608 of FIG. 6.

Returning to FIG. 2, the virtual view of the electronic device 104 on the electronic device 102 is to be activated or deactivated is determined in response to any one or more of a variety of different events. One example of such an event is detecting that the electronic device 102 and the electronic device 104 are connected to one another. Another example of such an event is movement of one or both of the electronic device 102 or the electronic device 104 (e.g., based on accelerometer or gyrometer in the electronic device 102 or electronic device 104).

In one or more implementations, whether the virtual view of the electronic device 104 on the electronic device 102 is to be activated or deactivated is checked at regular or irregular intervals (e.g., in response to movement of the electronic device 102 or the electronic device 104). The virtual view is disabled or deactivated in response to the electronic devices 102 and 104 no longer being connected or in response to a determination that the virtual view is to be deactivated.

For example, the virtual view of the electronic device 104 on the electronic device 102 is activated in response to detecting that the two electronic devices are connected to one another and the contextual state of the electronic device 104 indicating that the virtual view is to be activated. This determination of whether the virtual view is to be activated is maintained and used by the electronic devices 102 and 104 (e.g., for display of the virtual view of the electronic device 104 on the display of the electronic device 102) until movement of one or both of the electronic devices is detected. In response to such detected movement, whether the virtual view is to be activated is again determined (e.g., after the movement has stopped, such as stopped for a threshold amount of time (e.g., 2 or 3 seconds)). This new determination of whether the virtual view is to be activated is maintained and used by the electronic devices 102 and 104 (e.g., for display of the virtual view of the electronic device 104 on the display of the electronic device 102) until movement of one or both of the electronic devices is again detected.

When the virtual view of the electronic device 104 is displayed on the display of the electronic device 102, a user interface transmitter 212 transmits the user interface generated by the electronic device 104 to the electronic device 102, and the virtual view management system 122 displays the user interface on the display of the electronic device 102. In one example the electronic device 104 also displays the user interface on the display of the electronic device 104. In another example the electronic device 104 does not display the user interface on the display of the electronic device 104.

The electronic device 104 receives user input via the input control device 202. This user input can take various forms, such as movement of a cursor or pointer, selection of a button or switch, selection of a pull-down menu, and so forth. An input controller 214 of the electronic device 102 receives this user input and performs whatever action is indicated by the user input, such as moving a pointer or cursor, activating, or selecting a button that is clicked on, and so forth, or provides an indication of the user input to an input controller 216 of the electronic device 104. This indication of the user input can include various information, such as a direction of movement of the input control device 202, an amount or length of movement of the input control device 202, user activation of a button (e.g., a mouse click), and so forth. The input controller 216 performs whatever action is indicated by the received indication, such as activating or selecting a button that is clicked on, and so forth.

Whether the input controller 214 performs the action indicated by the user input or provides an indication of the user input to the input controller 216 depends on the user input and a current location of a pointer or cursor. The input controller 214 knows the location of the virtual view when the virtual view of the electronic device 104 is displayed on the display of the electronic device 102. For movement of a cursor or pointer, the input controller 214 performs whatever action is indicated by the user input. However, for activating or selecting a button that is clicked on, dragging and dropping an icon or widget, and so forth, the input controller 214 provides an indication of the action to the input controller 216. The input controller 216 performs the indicated action and updates the user interface of the electronic device 104 that is displayed in the virtual view based on the indicated action (e.g., displays the user interface of an application that was launched in response to the user input). In situations where the virtual view is resized on the display of the electronic device 102, the input controller 214 knows the dimensions of the display of the electronic device 104 and the dimensions of the resized virtual view and can readily map locations in the resized virtual view to locations in the UI received form the electronic device 104.

It should be noted that some discussions herein refer to two electronic devices. However, it is to be appreciated that one electronic device may be connected to multiple other devices, such as one to the right and one above, one to the right and one to the left, and so forth. The techniques discussed herein apply to situations where one or more electronic devices are connected to another electronic device. Accordingly, two virtual views may displayed on the display of the electronic device 102 concurrently, one virtual view of the display of a first of two electronic devices connected to the electronic device 102, and another virtual view of the display of a second of the two electronic device connected to the electronic device 102.

Figure 9:
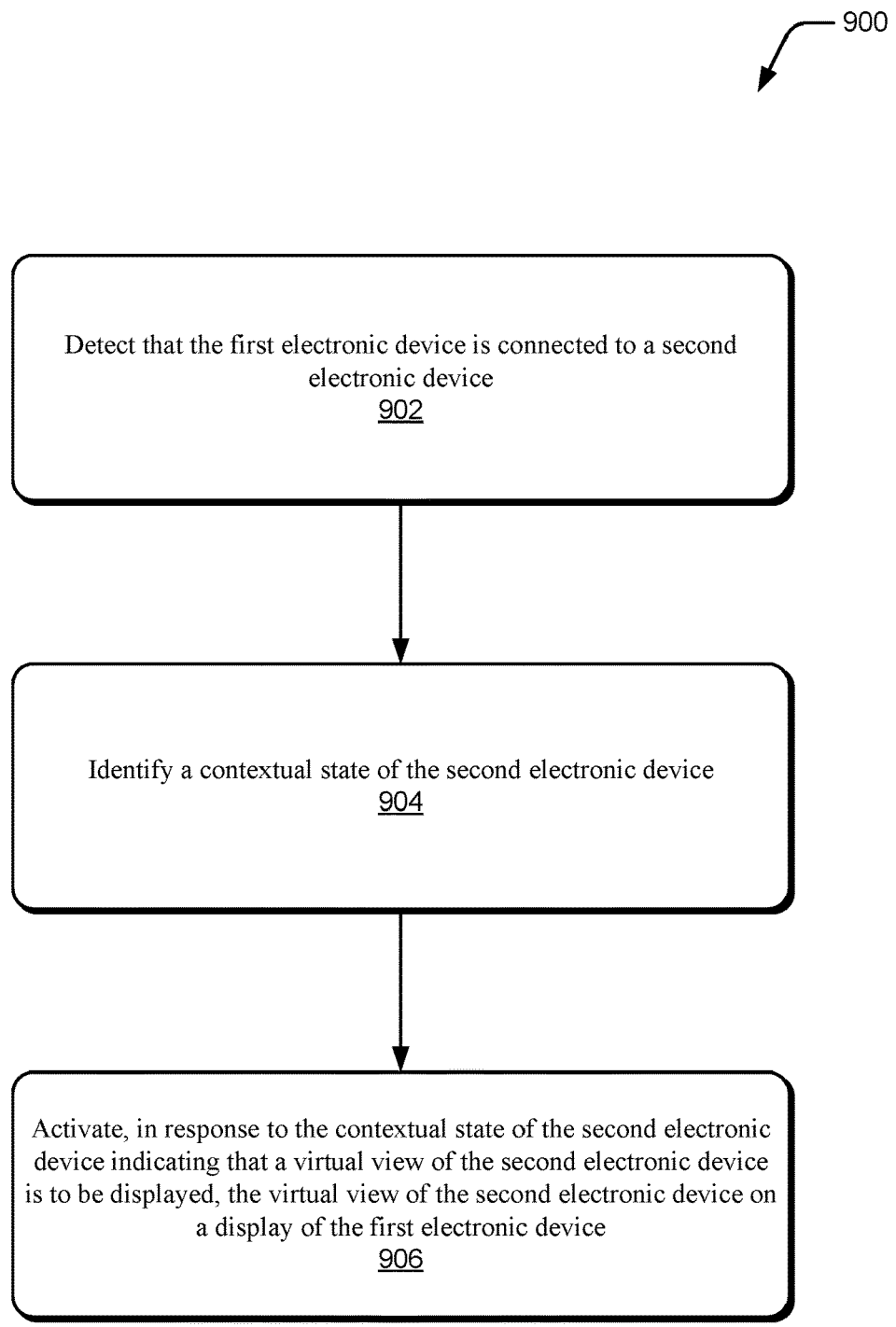
FIG. 9 illustrates an example process for implementing the techniques discussed herein in accordance with one or more embodiments.

FIG. 9 illustrates an example process 900 for implementing the techniques discussed herein in accordance with one or more embodiments. Process 900 is carried out at least in part by one or more components of an electronic device, such as an electronic device 102 or an electronic device 104 of FIG. 1 or FIG. 2, and can be implemented in software, firmware, hardware, or combinations thereof. Process 900 is shown as a set of acts and is not limited to the order shown for performing the operations of the various acts.

In process 900, the first electronic device being connected to the second electronic device is detected (act 902).

A contextual state of the second electronic device is identified (act 904). This contextual state of the second electronic device may be whether the second electronic device is lying face down (e.g., on a surface such as a desk or table), whether a display of the second electronic device is turned off, whether a display of the second electronic device is spatially aligned with a display of the first electronic device, a size of the display of the second electronic device (e.g., relative to a size of the display of the first electronic device), and so forth.

In response to the contextual state of the second electronic device indicating that a virtual view of the second electronic device is to be displayed, the virtual view of the second electronic device on a display of the first electronic device is activated (act 906). This activation can take various forms, such as automatically displaying the virtual view on the display of the first electronic device, automatically displaying an indication along an edge of the display of the first electronic device that can be selected by a user of the first electronic device, and so forth.

Figure 10:
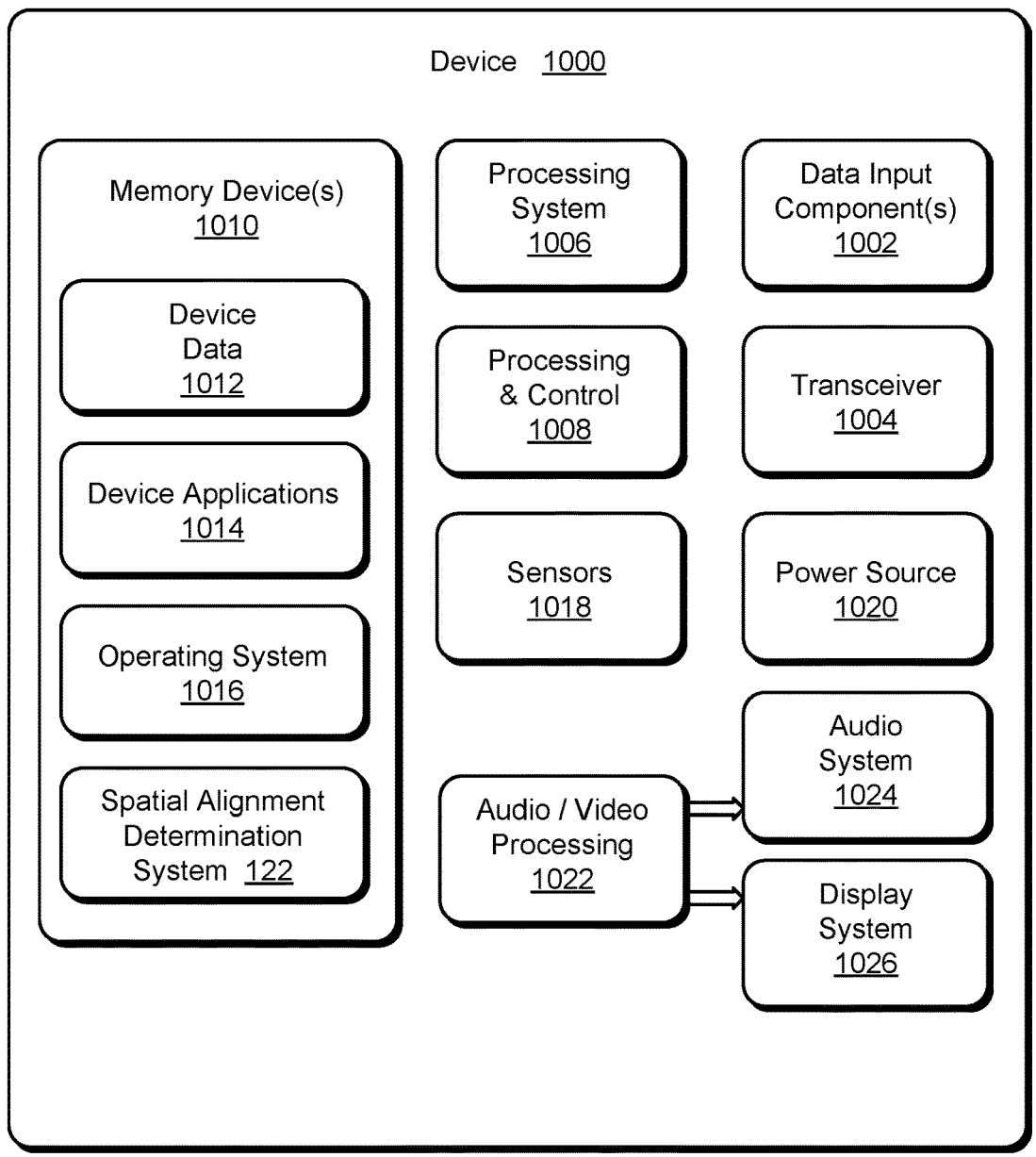
FIG. 10 illustrates various components of an example electronic device in which embodiments of the techniques discussed herein can be implemented.

FIG. 10 illustrates various components of an example electronic device in which embodiments of the techniques discussed herein can be implemented. The electronic device 1000 can be implemented as any of the devices described with reference to the previous FIGS., such as any type of client device, mobile phone, tablet, computing, communication, entertainment, gaming, media electronic playback, or other type of electronic device. In one or more embodiments the device 1000 is an electronic device 102 or electronic device 104 and includes one or both of the contextual state determination system 208 or the virtual view management system 122, described above.

The electronic device 1000 includes one or more data input components 1002 via which any type of data, media content, or inputs can be received such as user-selectable inputs, messages, music, television content, recorded video content, and any other type of text, audio, video, or image data received from any content or data source. The data input components 1002 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 1002 may also include various other input components such as microphones, touch sensors, touchscreens, keyboards, and so forth.

The device 1000 includes communication transceivers 1004 that enable one or both of wired and wireless communication of device data with other devices. The device data can include any type of text, audio, video, image data, or combinations thereof. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, wired local area network (LAN) Ethernet transceivers for network data communication, and cellular networks (e.g., third generation networks, fourth generation networks such as LTE networks, or fifth generation networks).

The device 1000 includes a processing system 1006 of one or more processors (e.g., any of microprocessors, controllers, and the like) or a processor and memory system implemented as a system-on-chip (SoC) that processes computer-executable instructions. The processing system 1006 may be implemented at least partially in hardware, which can include components of an integrated circuit or on-chip system, an application-specific integrated circuit (ASIC), a field-programmable gate array (FPGA), a complex programmable logic device (CPLD), and other implementations in silicon or other hardware.

Alternately or in addition, the device can be implemented with any one or combination of software, hardware, firmware, or fixed logic circuitry that is implemented in connection with processing and control circuits, which are generally identified at 1008. The device 1000 may further include any type of a system bus or other data and command transfer system that couples the various components within the device. A system bus can include any one or combination of different bus structures and architectures, as well as control and data lines.

The device 1000 also includes computer-readable storage memory devices 1010 that enable data storage, such as data storage devices that can be accessed by an electronic device, and that provide persistent storage of data and executable instructions (e.g., software applications, programs, functions, and the like stored thereon). Examples of the computer-readable storage memory devices 1010 include volatile memory and non-volatile memory, fixed and removable media devices, and any suitable memory device or electronic data storage that maintains data for electronic device access. The computer-readable storage memory can include various implementations of random access memory (RAM), read-only memory (ROM), flash memory, and other types of storage media in various memory device configurations. The device 1000 may also include a mass storage media device.

The computer-readable storage memory device 1010 provides data storage mechanisms to store the device data 1012, other types of information or data, and various device applications 1014 (e.g., software applications). For example, an operating system 1016 can be maintained as software instructions with a memory device and executed by the processing system 1006 to cause the processing system 1006 to perform various operations or actions. The device applications 1014 may also include a device manager, such as any form of a control application, software application, signal-processing and control module, code that is native to a particular device, a hardware abstraction layer for a particular device, and so on.

The device 1000 can also include one or more device sensors 1018, such as any one or more of an ambient light sensor, a proximity sensor, a touch sensor, an infrared (IR) sensor, an accelerometer, a gyroscope, a magnetometer, a thermal sensor, an audio sensor (e.g., microphone), and the like. The device 1000 can also include one or more power sources 1020, such as when the device 1000 is implemented as a computing device. The power sources 1020 may include a charging or power system, and can be implemented as a flexible strip battery, a rechargeable battery, a charged super-capacitor, or any other type of active or passive power source.

The device 1000 additionally includes an audio or video processing system 1022 that generates one or both of audio data for an audio system 1024 and display data for a display system 1026. In accordance with some embodiments, the audio/video processing system 1022 is configured to receive call audio data from the transceiver 1004 and communicate the call audio data to the audio system 1024 for playback at the device 1000. The audio system or the display system may include any devices that process, display, or otherwise render audio, video, display, or image data. Display data and audio signals can be communicated to an audio component or to a display component, respectively, via an RF (radio frequency) link, S-video link, HDMI (high-definition multimedia interface), composite video link, component video link, DVI (digital video interface), analog audio connection, or other similar communication link. In implementations, the audio system or the display system are integrated components of the example device. Alternatively, the audio system or the display system are external, peripheral components to the example device.

As used herein, including in the claims, "or" as used in a list of items (e.g., a list of items prefaced by a phrase such as "at least one of" or "one or more of" or "one or both of") indicates an inclusive list such that, for example, a list of at least one of A, B, or C means A or B or C or AB or AC or BC or ABC (i.e., A and B and C). By way of another example, a list of at least one of A; B; or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on".

Although embodiments of techniques for virtual view of a device based on device contextual state have been described in language specific to features or methods, the subject of the appended claims is not necessarily limited to the specific features or methods described. Rather, the specific features and methods are disclosed as example implementations of techniques for implementing virtual view of a device based on a device contextual state. Further, various different embodiments are described, and it is to be appreciated that each described embodiment can be implemented independently or in connection with one or more other described embodiments. Additional aspects of the techniques, features, and/or methods discussed herein relate to one or more of the following.

In some aspects, the techniques described herein relate to a first electronic device, including: at least one memory; and at least one processor coupled with the at least one memory and configured to cause the first electronic device to: detect that the first electronic device is connected to a second electronic device; identify a contextual state of the second electronic device; and activate, in response to the contextual state of the second electronic device indicating that a virtual view of the second electronic device is to be displayed, the virtual view of the second electronic device on a display of the first electronic device.

In some aspects, the techniques described herein relate to a first electronic device, wherein to activate the virtual view is to automatically display the virtual view on the display of the first electronic device.

In some aspects, the techniques described herein relate to a first electronic device, wherein the at least one processor is configured to cause the first electronic device to cease displaying the virtual view of the second electronic device on the display of the first electronic device in response to the contextual state of the second electronic device subsequently indicating that the virtual view of the second electronic device is not to be displayed.

In some aspects, the techniques described herein relate to a first electronic device, wherein to activate the virtual view is to automatically display an indication along an edge of the display of the first electronic device, and the at least one processor is configured to cause the first electronic device to display the virtual view on the display of the first electronic device in response to a user of the first electronic device selecting or hovering over the indication.

In some aspects, the techniques described herein relate to a first electronic device, wherein the contextual state of the second electronic device indicates that the display of the first electronic device and a display of the second electronic device are not spatially aligned.

In some aspects, the techniques described herein relate to a first electronic device, wherein the contextual state of the second electronic device indicates that the second electronic device is lying face down.

In some aspects, the techniques described herein relate to a first electronic device, wherein the contextual state of the second electronic device indicates that a display of the second electronic device is turned off.

In some aspects, the techniques described herein relate to a first electronic device, wherein to activate the virtual view is to activate the virtual view of the second electronic device on the display of the first electronic device in response to a size of a display of the second electronic device being less than a size of the display of the first electronic device by at least a threshold amount.

In some aspects, the techniques described herein relate to a first electronic device, wherein the virtual view of the second electronic device is displayed in a freeform window on the display of the second electronic device.

In some aspects, the techniques described herein relate to a first electronic device, wherein the first electronic device includes a laptop computer and the second electronic device includes a mobile phone.

In some aspects, the techniques described herein relate to a first electronic device, wherein the first electronic device includes a laptop computer and the second electronic device includes a tablet.

In some aspects, the techniques described herein relate to a first electronic device, wherein the first electronic device includes a tablet and the second electronic device includes a mobile phone.

In some aspects, the techniques described herein relate to a first electronic device, including: at least one processor implemented in hardware; and at least one computer-readable storage memory having stored thereon multiple instructions that, responsive to execution by the at least one processor, cause the at least one processor to: detect that the first electronic device is connected to a second electronic device; identify a contextual state of the second electronic device; and activate, in response to the contextual state of the second electronic device indicating that a virtual view of the second electronic device is to be displayed, the virtual view of the second electronic device on a display of the first electronic device.

In some aspects, the techniques described herein relate to a first electronic device, wherein to activate the virtual view is to automatically display the virtual view on the display of the first electronic device.

In some aspects, the techniques described herein relate to a first electronic device, wherein the multiple instructions, responsive to execution by the at least one processor, cause the at least one processor to cease displaying the virtual view of the second electronic device on the display of the first electronic device in response to the contextual state of the second electronic device subsequently indicating that the virtual view of the second electronic device is not to be displayed.

In some aspects, the techniques described herein relate to a first electronic device, wherein the contextual state of the second electronic device indicates that at least one of the display of the first electronic device and a display of the second electronic device are not spatially aligned, the second electronic device is lying face down, or a display of the second electronic device is turned off.

In some aspects, the techniques described herein relate to a method, implemented in a first electronic device, the method including: detecting that the first electronic device is connected to a second electronic device; identifying a contextual state of the second electronic device; and activating, in response to the contextual state of the second electronic device indicating that a virtual view of the second electronic device is to be displayed, the virtual view of the second electronic device on a display of the first electronic device.

In some aspects, the techniques described herein relate to a method, wherein activating the virtual view includes automatically displaying the virtual view on the display of the first electronic device.

In some aspects, the techniques described herein relate to a method, wherein the contextual state of the second electronic device indicates that at least one of the display of the first electronic device and a display of the second electronic device are not spatially aligned, the second electronic device is lying face down, or a display of the second electronic device is turned off.

In some aspects, the techniques described herein relate to a method, wherein activating the virtual view includes activating the virtual view of the second electronic device on the display of the first electronic device in response to a size of a display of the second electronic device being less than a size of the display of the first electronic device by at least a threshold amount.

What is claimed is:
1. A first electronic device, comprising:
at least one memory; and
at least one processor coupled with the at least one memory and configured to cause the first electronic device to:
detect that the first electronic device is connected to a second electronic device;

receive information including images, the images indicating a position of a head of a user relative to a display of the first electronic device and a display of the second electronic device;

identify a contextual state of the second electronic device based on the information, wherein the contextual state of the second electronic device indicates that the display of the first electronic device and the display of the second electronic device are not facing approximately a same direction, and wherein the contextual state of the second electronic device indicates that a virtual view of the second electronic device is to be displayed based on one or more criteria;

determine that the contextual state satisfies the one or more criteria; and activate, in response to the contextual state of the second electronic device satisfying the one or more criteria, the virtual view of the second electronic device on the display of the first electronic device.

2. The first electronic device of claim 1, wherein to activate the virtual view is to automatically display the virtual view on the display of the first electronic device.

3. The first electronic device of claim 2, wherein the at least one processor is configured to cause the first electronic device to cease displaying the virtual view of the second electronic device on the display of the first electronic device in response to the contextual state of the second electronic device subsequently indicating that the virtual view of the second electronic device is not to be displayed.

4. The first electronic device of claim 1, wherein to activate the virtual view is to automatically display an indication along an edge of the display of the first electronic device, and the at least one processor is configured to cause the first electronic device to display the virtual view on the display of the first electronic device in response to a user of the first electronic device selecting or hovering over the indication.

5. The first electronic device of claim 1, wherein the contextual state of the second electronic device indicates that the display of the first electronic device and the display of the second electronic device are not spatially aligned.

6. The first electronic device of claim 1, wherein to activate the virtual view is to activate the virtual view of the second electronic device on the display of the first electronic device in response to a size of the display of the second electronic device being less than a size of the display of the first electronic device by at least a threshold amount.

7. The first electronic device of claim 1, wherein the virtual view of the second electronic device is displayed in a freeform window on the display of the second electronic device.

8. The first electronic device of claim 1, wherein the first electronic device comprises a laptop computer and the second electronic device comprises a mobile phone.

9. The first electronic device of claim 1, wherein the first electronic device comprises a laptop computer and the second electronic device comprises a tablet.

10. The first electronic device of claim 1, wherein the first electronic device comprises a tablet and the second electronic device comprises a mobile phone.

11. The first electronic device of claim 1, wherein the images further indicate a gaze of the user relative to the display of the first electronic device and the display of the second electronic device.

12. The first electronic device of claim 11, wherein determining that the contextual state satisfies the one or more criteria is based on the position of the head and the gaze of the user.

13. A first electronic device, comprising:
at least one processor implemented in hardware; and
at least one computer-readable storage memory having stored thereon multiple instructions that, responsive to execution by the at least one processor, cause the at least one processor to:
detect that the first electronic device is connected to a second electronic device;
receive information including images, the images indicating a position of a head of a user relative to a display of the first electronic device and a display of the second electronic device;
identify a contextual state of the second electronic device based on the information, wherein the contextual state indicates that the display of the first electronic device and the display of the second electronic device are not facing approximately a same direction, and wherein the contextual state of the second electronic device indicates that a virtual view of the second electronic device is to be displayed based on one or more criteria;
determine that the contextual state satisfies the one or more criteria; and
activate, in response to the contextual state of the second electronic device satisfying the one or more criteria, the virtual view of the second electronic device on the display of the first electronic device.

14. The first electronic device of claim 13, wherein to activate the virtual view is to automatically display the virtual view on the display of the first electronic device.

15. The first electronic device of claim 14, wherein the multiple instructions, responsive to execution by the at least one processor, cause the at least one processor to cease displaying the virtual view of the second electronic device on the display of the first electronic device in response to the contextual state of the second electronic device subsequently indicating that the virtual view of the second electronic device is not to be displayed.

16. The first electronic device of claim 13, wherein the contextual state of the second electronic device indicates that the display of the first electronic device and the display of the second electronic device are not spatially aligned.

17. A method, implemented in a first electronic device, the method comprising:
detecting that the first electronic device is connected to a second electronic device;
receiving information including images, the images indicating a position of a head of a user relative to a display of the first electronic device and a display of the second electronic device;
identifying a contextual state of the second electronic device based on the information, wherein the contextual state indicates that the display of the first electronic device and the display of the second electronic device are not facing approximately a same direction, and wherein the contextual state of the second electronic device indicates that a virtual view of the second electronic device is to be displayed based on one or more criteria;
determining that the contextual state satisfies the one or more criteria; and
activating, in response to the contextual state of the second electronic device satisfying the one or more criteria, the virtual view of the second electronic device on the display of the first electronic device.

18. The method of claim 17, wherein activating the virtual view comprises automatically displaying the virtual view on the display of the first electronic device.

19. The method of claim 17, wherein the contextual state of the second electronic device indicates that the display of the first electronic device and the display of the second electronic device are not spatially aligned.

20. The method of claim 17, wherein activating the virtual view comprises activating the virtual view of the second electronic device on the display of the first electronic device in response to a size of the display of the second electronic device being less than a size of the display of the first electronic device by at least a threshold amount.

* * * * *